_United States Patent Office_

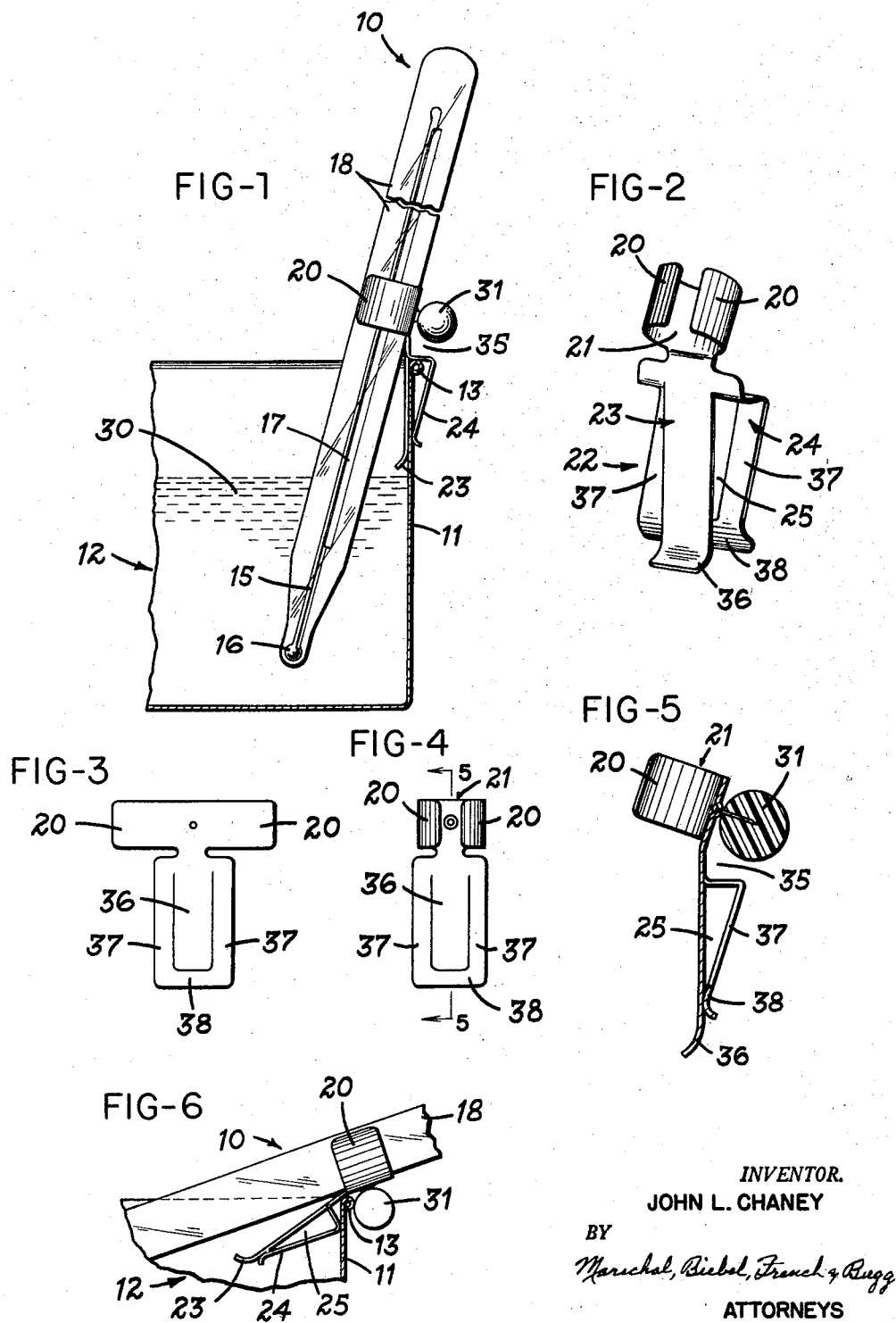

2,906,124
Patented Sept. 29, 1959

2,906,124
COOKING THERMOMETER SUPPORT

John L. Chaney, Walworth, Wis.

Application April 28, 1954, Serial No. 426,204

2 Claims. (Cl. 73—374)

This invention relates to cooking thermometers and more particularly to a device for supporting the thermometer in proper position in use on a cooking pan.

One of the principal objects of the invention is to provide such a clip for a cooking thermometer which will support the thermometer in use with its bulb immersed in the cooking liquid in the pan and located inwardly in spaced relation with respect to the side wall of the pan and above the bottom thereof to be responsive to the internal temperature of the cooking liquid, substantially independently of the temperature of the pan.

Another object is to provide such a clip of simple and economical construction which may readily be fitted on a cooking thermometer and easily adjusted so that the thermometer may be left in the pan during cooking, supported therein at a desired angle for viewing, and which is adapted for use with cooking pans of different sizes and having different kinds of rims or beads at the upper edges thereof.

It is also an object to provide such a clip which is adaptable for supporting the cooking thermometer in a first position with its barrel at an angle to the side of the pan and the bulb located interiorly of the pan and spaced from the side and the bottom thereof in the cooking liquid, and also for supporting the thermometer in a second position with its barrel at a greater angle to the side of the pan and with the bulb substantially higher and above the level of the liquid in the pan for facilitating dripping of any liquid clinging to the bulb.

Other objects and advantages of the invention will be apparent from the following description, the accompanying drawing, and the appended claims.

In the drawing:

Fig. 1 is a perspective view showing a clip in accordance with the invention in use supporting a cooking thermometer on the side of a pan with its bulb immersed in the cooking liquid therein;

Fig. 2 is a perspective view of the clip alone;

Fig. 3 is a plan view of a blank from which the clip may be formed;

Fig. 4 is a plan view showing a step in forming the clip from the blank of Fig. 3;

Fig. 5 is a section taken lengthwise through the clip substantially on line 5—5 of Fig. 4; and Fig. 6 is a view similar to Fig. 1 showing the clip supporting the thermometer at a greater angle to the side of the pan with its bulb supported in a dripping position.

Referring to the drawing, which illustrates a preferred embodiment of the invention, Fig. 1 shows a clip in accordance with the invention in use supporting a cooking thermometer indicated generally by the numeral 10 on the wall 11 of a cooking pan 12, the wall including a rim or thicker section 13 around its upper edge. The cooking thermometer includes the customary capillary tube thermometer 15 having a bulb 16 and a scale or indicia bearing member 17 associated therewith enclosed in barrel 18 of clear glass and of sufficient internal diameter to receive the thermometer per se. The clip, which is preferably made from resilient material, includes a pair of opposed arms 20 formed to define a split ring 21 for resiliently gripping the barrel 18 above bulb 16, and a mounting portion 22 including inner and outer jaws 23 and 24 respectively defining between them an elongated slot 25. Mounting portion 22 extends at an angle to the axis of barrel 18 so that when slot 25 is engaged over side wall 11 of the pan, thermometer 10 is supported with its bulb immersed in the cooking liquid 30 in the pan and located inwardly in spaced relation with respect to the side wall of the pan and also the bottom thereof.

Affixed to mounting ring 21 is a spherical handle 31 for manipulating the thermometer when hot, which may be made of heat-insulating material such as wood, hard rubber, heat-resistant plastic or other suitable substance.

As appears from the drawing at least one of arms 23 and 24 is formed in the shape of an elongated S providing with the other arm a slot closed at its upper end and open at its lower end. By reason of the S shape a portion of arm 24 at the upper end of the slot is removed from the facing portion of the other arm 23 for accommodating the thicker section formed by the rim or bead 13 around the upper periphery of the cooking pan, and the lower portion of the arm 24 is normally disposed in close proximity to the other arm 23 for resiliently gripping side wall 11 below the thicker section. By reason of the resilient material from which the clip is made the slot may easily be engaged over the side wall of the pan, which will be gripped between the lower portions of the arms for supporting the thermometer with its barrel at an angle to the side of the pan and the bulb positioned in the liquid, and spaced from the side and the bottom of the pan to be responsive to the temperature of the liquid substantially independently of the temperature of the pan. The resilience of the material and the gripping action permit a degree of adjustment of the angle of the thermometer for convenient viewing.

Handle 31 is secured to ring 21 at a position above the top of S-shaped arm 24. Thus it forms with arm 24 an opening 35 for receiving the upper rim of the cooking pan as shown in Fig. 6 and supporting the thermometer with its barrel 18 at a greater angle to the side of the pan than in the position shown in Fig. 1, with the bulb thereof in a second position substantially higher than in the first position and above the level of the liquid in the pan for facilitating dripping of liquid clinging from the bulb into the pan.

As will be apparent the device may readily be stamped from resilient sheet metal or other suitable material and at the same time formed into shape so that it may be manufactured at relatively small cost. It may easily be formed as indicated in Figs. 3–5 inclusive, with the blank first being cut to provide tabs 20 for forming the thermometer gripping part at one end and tongue and arm portions 36 and 37 formed at the other end to be formed into the supporting part. Arm portions 37 are joined at their lower ends by a connecting strip 38, and when they are bent into the form of an elongated S as shown in Fig. 5 they will substantially straddle tongue portion 36 and define therewith slot 25 for resiliently engaging over the pan wall.

The device of the invention accordingly provides a relatively inexpensive and useful clip for supporting a cooking thermometer in use. When the pan is put over the heat, the thermometer may be clipped to the side thereof and merely left in position there. By reason of the split in ring 20, the thermometer may easily be positioned therein so that its scale is readily read for its full length, and at the desired angle for viewing. Thus it is not necessary repeatedly to test the liquid, but merely to observe the thermometer from time to time until the cooking liquid reaches the desired temperature. The bulb is supported interiorly of the pan and removed from the side and bottom thereof so that the thermometer is responsive to the temperature of the liquid itself independently of and uninfluenced by the temperature of the pan, a useful feature in connection with making candy, for example. The hand of the user is protected from heat by the non-heat-conducting handle, by which the thermometer may easily be manipulated.

When it is desired, in cooking viscous or sticky liquids, to remove the thermometer from the liquid, there is no need to hold it or to scrape off any of the cooking liquid adhering thereto, but it may merely be supported over the side of the pan by fitting opening 35 over the pan edge until all of the liquid has dripped back into the pan. In this manner waste of the cooking liquid is avoided, and also the possibility of undesirable dripping of liquid on table, floor, or the like.

While the form of article herein described constitutes a preferred embodiment of the invention, it is to be understood that the invention is not limited to the precise form of the article and that changes may be made therein without departing from the scope of the invention which is defined in the appended claims.

What is claimed is:

1. A clip for supporting a cooking thermometer on the wall of a cooking pan formed from a blank of resilient sheet material and including a thermometer gripping part and a mounting part integral therewith, tabs on said gripping part shaped to resiliently receive the barrel of said thermometer, said mounting part of said clip having inner and outer arms defining therebetween an elongated open slot extending at an angle to the axis of said barrel and closed at its upper end for resiliently receiving the side wall of the cooking pan therein with said arms on opposite sides of said wall, said outer arm having an offset portion, for supporting said thermometer in a first position with its barrel at an angle to the side of the pan and with the bulb thereof located interiorly of said pan and spaced from the side and the bottom thereof, and a handle secured to said thermometer gripping part at a position above the juncture of said arms, said offset portion of said outer arm extending outwardly from said inner arm at an angle thereto and forming with said handle an opening for receiving the upper rim of said cooking pan and supporting said thermometer with its barrel in a second position at a greater angle to the side of the pan and with the bulb thereof in a substantially higher position than in said first position facilitating dripping from said bulb into the liquid in said pan.

2. In a cookng thermometer adapted to be supported on the side wall of a cooking pan for measuring the temperature of liquid in said pan independently of the temperature of said pan and including a capillary tube thermometer and associated indicia bearing member enclosed in a barrel of transparent heat-resisting material, the combination of a split metal ring resiliently gripping said barrel with the indicia bearing member readable through the split in said ring, a mounting portion integral with said split ring having inner and outer arms extending at an angle to the axis of said ring defining therebetween an elongated open slot for resiliently engaging over the side wall of the cooking pan and supporting said barrel with the bulb of said thermometer located in the liquid in said pan in inwardly spaced relation with respect to the side wall and bottom of said pan, said inner arm being a cut-out central portion of said outer arm integral therewith, the upper end of said outer arm being offset and spaced from said inner arm for accommodating a rim at the upper edge of the said wall of said pan, said offset arm being bent at an angle to bring its lower end directly opposite and into proximity with the lower end of said inner arm to resiliently engage the opposite sides of the wall of said pan therebetween, and a handle secured to said split ring in predetermined spaced relation from the offset portion of said outer arm defining therewith an opening for receiving the rim of said pan and supporting said thermometer bulb in a different substantially higher position facilitating dripping from said bulb into said pan.

References Cited in the file of this patent

UNITED STATES PATENTS

| 148,355 | Dennett | Mar. 10, 1874 |
| 568,121 | Varian | Sept. 22, 1896 |
| 807,840 | Martin et al. | Dec. 19, 1905 |
| 1,117,277 | Supplee | Nov. 17, 1914 |
| 1,540,394 | Hall et al. | June 2, 1925 |
| 1,895,656 | Gadke | Jan. 31, 1933 |
| 1,991,364 | Matter | Feb. 19, 1935 |
| 2,315,269 | Morgillo | Mar. 30, 1943 |
| 2,605,945 | Deckar | Aug. 5, 1952 |

FOREIGN PATENTS

| 383,138 | Great Britain | Nov. 10, 1932 |